United States Patent
Kawashima et al.

(10) Patent No.: US 11,515,542 B2
(45) Date of Patent: Nov. 29, 2022

(54) FUEL BATTERY

(71) Applicant: Panasonic Intellectual Property Management Co., Ltd., Osaka (JP)

(72) Inventors: Tsutomu Kawashima, Nara (JP); Shinichiro Imura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/338,584

(22) Filed: Jun. 3, 2021

(65) Prior Publication Data
US 2021/0408554 A1    Dec. 30, 2021

(30) Foreign Application Priority Data

Jun. 30, 2020 (JP) .............................. JP2020-113059

(51) Int. Cl.
| | |
|---|---|
| *H01M 4/88* | (2006.01) |
| *H01M 8/0239* | (2016.01) |
| *H01M 8/026* | (2016.01) |
| *H01M 8/1004* | (2016.01) |
| *H01M 8/10* | (2016.01) |

(52) U.S. Cl.
CPC ......... *H01M 4/8807* (2013.01); *H01M 8/026* (2013.01); *H01M 8/0239* (2013.01); *H01M 8/1004* (2013.01); *H01M 2008/1095* (2013.01)

(58) Field of Classification Search
CPC .................................................. H01M 4/8807
See application file for complete search history.

(56) References Cited

U.S. PATENT DOCUMENTS

| | | | | |
|---|---|---|---|---|
| 2003/0091891 | A1* | 5/2003 | Yoshida | H01M 8/0243 429/534 |
| 2004/0058223 | A1* | 3/2004 | Shibata | H01M 8/1007 429/480 |
| 2011/0287334 | A1 | 11/2011 | Tanaka | |
| 2014/0154607 | A1* | 6/2014 | Kotaka | H01M 8/1007 429/482 |
| 2018/0301711 | A1 | 10/2018 | Kawashima et al. | |

(Continued)

FOREIGN PATENT DOCUMENTS

| | | |
|---|---|---|
| JP | 2010-218817 | 9/2010 |
| JP | 2012-190619 | 10/2012 |

(Continued)

*Primary Examiner* — Brian R Ohara
(74) *Attorney, Agent, or Firm* — Wenderoth, Lind & Ponack. L.L.P.

(57) ABSTRACT

A fuel battery includes a membrane-electrode assembly including a first catalyst layer and a first gas diffusion layer stacked on a first surface of a polymer electrolyte membrane, and a second catalyst layer and a second gas diffusion layer stacked on a second surface of the polymer electrolyte membrane. The membrane-electrode assembly is interposed between a first separator and a second separator. The first separator includes a rib and a groove on a surface that is in contact with the first gas diffusion layer, the rib and the groove defining a gas flow path through which a reaction gas is to flow. A thickness of the first gas diffusion layer is defined as h, and a width of a portion of the rib that is in contact with the first gas diffusion layer is defined as Rw such that $0.29\ Rw \leq h \leq 0.55\ Rw$ is satisfied.

16 Claims, 8 Drawing Sheets

(56) References Cited

U.S. PATENT DOCUMENTS

2019/0379064 A1    12/2019  Kawashima et al.
2020/0381759 A1*   12/2020  Kajiwara ............ H01M 8/0273

FOREIGN PATENT DOCUMENTS

| JP | 2012-227108 | 11/2012 |
| JP | 2017-168227 | 9/2017 |
| JP | 2018-078003 | 5/2018 |
| JP | 2019-216084 | 12/2019 |
| WO | 2010/061703 | 6/2010 |
| WO | 2017/085901 | 5/2017 |

* cited by examiner 31  32  33

Table 1

|  |  |  |  | Example | | | Comparative example | |
|---|---|---|---|---|---|---|---|---|
|  |  |  |  | 1 | 2 | 3 | 1 | 2 |
| Cathode GDL | GDL base material | Presence/absence |  | Absence | Absence | Absence | Absence | Absence |
|  | Fiber of carbon fiber forming GDL | Fl | mm | 0.006 | 0.006 | 0.006 | 0.006 | 0.006 |
|  | Fiber of carbon fiber forming GDL | Fd | μm | 0.150 | 0.150 | 0.150 | 0.150 | 0.150 |
|  | GDL thickness | h | mm | 0.145 | 0.165 | 0.185 | 0.125 | 0.285 |
| Cathode separator | Rib width | Rw | mm | 0.5 | 0.5 | 0.5 | 0.5 | 0.5 |
|  | Groove width | Gw | mm | 0.5 | 0.5 | 0.5 | 0.5 | 0.5 |
|  | GDL thickness/rib width | h/Rw | — | 0.29 | 0.33 | 0.37 | 0.25 | 0.57 |
|  | Fiber length (rib width/2) | Fl/(Rw/2) |  | 0.02 | 0.02 | 0.02 | 0.02 | 0.02 |
|  | Fiber diameter/GDL thickness | Fd/h |  | 0.0010 | 0.0009 | 0.0008 | 0.0012 | 0.0005 |
|  | Protruding amount of GDL into groove | p | μm | 9 | 11 | 14 | 8 | 21 |
| Battery evaluation | Cell voltage |  | V | 0.062 | 0.083 | 0.057 | 0.000 | -0.057 |
|  | Diffusion overvoltage |  | V | -0.04 | -0.055 | -0.038 | 0.000 | 0.029 |
|  | Resistance overvoltage |  | V | -0.004 | -0.012 | -0.005 | 0.000 | 0.027 |

FIG. 10

Table 2

| | | | | Example | | | | Comparative example | | |
|---|---|---|---|---|---|---|---|---|---|---|
| | | | | 4 | 5 | 6 | 7 | 3 | 4 | 5 |
| Cathode GDL | GDL base material | Presence/absence | | Absence | Absence | Absence | Absence | Absence | Absence | Presence |
| | Fiber of carbon fiber forming GDL | Fl | mm | 0.006 | 0.006 | 0.006 | 0.006 | 0.006 | 0.006 | 1.000 |
| | Fiber of carbon fiber forming GDL | Fd | μm | 0.150 | 0.150 | 0.150 | 0.150 | 0.150 | 0.150 | 8.000 |
| | GDL thickness | h | mm | 0.105 | 0.125 | 0.145 | 0.165 | 0.085 | 0.185 | 0.165 |
| Cathode separator | Rib width | Rw | mm | 0.3 | 0.3 | 0.3 | 0.3 | 0.3 | 0.3 | 0.3 |
| | Groove width | Gw | mm | 0.3 | 0.3 | 0.3 | 0.3 | 0.3 | 0.3 | 0.3 |
| | GDL thickness/rib width | h/Rw | — | 0.35 | 0.42 | 0.48 | 0.55 | 0.28 | 0.62 | 0.55 |
| | Fiber length (rib width/2) | Fl/(Rw/2) | | 0.04 | 0.04 | 0.04 | 0.04 | 0.04 | 0.04 | 6.67 |
| | Fiber diameter/GDL thickness | Fd/h | | 0.0014 | 0.0012 | 0.0010 | 0.0009 | 0.0018 | 0.0008 | 0.0485 |
| | Protruding amount of GDL into groove | p | μm | 5 | 6 | 8 | 10 | 4 | 12 | 0 |
| Battery evaluation | Cell voltage | | V | 0.157 | 0.196 | 0.168 | 0.147 | 0.079 | 0.108 | 0.085 |
| | Diffusion overvoltage | | V | -0.094 | -0.14 | -0.12 | -0.09 | -0.047 | -0.068 | -0.053 |
| | Resistance overvoltage | | V | -0.031 | -0.019 | -0.021 | -0.022 | -0.028 | -0.017 | -0.006 |

FUEL BATTERY

BACKGROUND

1. Technical Field

The present disclosure relates to a fuel battery, and more particularly, to a solid polymer fuel battery.

2. Description of the Related Art

In a solid polymer fuel battery, which is an example of a fuel battery, one side of a proton conductive polymer electrolyte membrane is exposed to a fuel gas such as hydrogen, and the other side is exposed to oxygen, and water is thus synthesized by a chemical reaction via the electrolyte membrane. As a result, reaction energy generated when synthesizing water is electrically extracted.

A single cell of the solid polymer fuel battery has a membrane-electrode assembly (hereinafter referred to as MEA) and a pair of conductive separators disposed on both sides of the MEA. The MEA includes a proton conductive polymer electrolyte membrane and a pair of electrode layers with the electrolyte membrane interposed therebetween. The pair of electrode layers have a catalyst layer formed on both sides of the polymer electrolyte membrane and containing carbon powders carrying a platinum group catalyst as a main component, and a gas diffusion layer formed on the catalyst layer and having a collecting action together with gas permeability and water repellency.

The separator includes, on a surface that is in contact with the gas diffusion layer, a rib and a groove for forming a gas flow path through which a reaction gas used for power generation flows.

The gas diffusion layer in the MEA supplies the reaction gas supplied from the gas flow path of the separator to the catalyst layer. In addition, the gas diffusion layer functions as a conductive path for electrons between the catalyst layer and the separator. Therefore, a conductive porous member may be used for the gas diffusion layer used in the MEA.

For example, Japanese Patent Unexamined Publication No. 2010-218817 discloses a fuel battery using a separator in which a rib and a groove for forming a gas flow path through which a reaction gas flows are formed, the fuel battery being to increase an amount of the reaction gas supplied to a region of the gas diffusion layer that faces a contact portion of the rib and the gas diffusion layer and reduce a contact resistance between the rib and the gas diffusion layer.

SUMMARY

According to an exemplary embodiment of the present disclosure, a fuel battery includes a membrane-electrode assembly (MEA) in which a catalyst layer and a gas diffusion layer are stacked on each of opposite surfaces of a polymer electrolyte membrane; and separators between which the membrane-electrode assembly is interposed, wherein each of the separators includes a rib and a groove on a surface that is in contact with the gas diffusion layer, the rib and the groove forming a gas flow path through which a reaction gas to be used for power generation flows, when a thickness of the gas diffusion layer is defined as h, and a width of a portion of the rib that is in contact with the gas diffusion layer is defined as Rw, $0.29 \text{ Rw} \leq h \leq 0.55 \text{ Rw}$ is satisfied, the gas diffusion layer includes conductive particles, conductive fibers, and a polymer resin, and average fiber length Fl and average fiber diameter Fd of the conductive fibers satisfy $Fl<Rw/2$ and $Fd<h/100$.

According to another exemplary embodiment of the present disclosure, a fuel battery includes a membrane-electrode assembly in which a catalyst layer and a gas diffusion layer are stacked on each of opposite surfaces of a polymer electrolyte membrane; and separators between which the membrane-electrode assembly is interposed, wherein each of the separators includes a rib and a groove on a surface that is in contact with the gas diffusion layer, the rib and the groove forming a gas flow path through which a reaction gas to be used for power generation flows, when a thickness of the gas diffusion layer is defined as h, and a width of a portion of the rib that is in contact with the gas diffusion layer is defined as Rw, $0.29 \text{ Rw} \leq h \leq 0.48 \text{ Rw}$ is satisfied, the gas diffusion layer includes conductive particles, conductive fibers, and a polymer resin, and average fiber length Fl and average fiber diameter Fd of the conductive fibers satisfy $Fl<Rw/2$ and $Fd<h/100$.

BRIEF DESCRIPTION OF THE DRAWINGS

FIG. 9 is a table showing the results of evaluation tests of Examples 1 to 3 and Comparative Examples 1 and 2; and FIG. 10 is a table showing the results of evaluation tests of Examples 4 to 7 and Comparative Examples 3 to 5.

DETAILED DESCRIPTIONS

Figure 1:
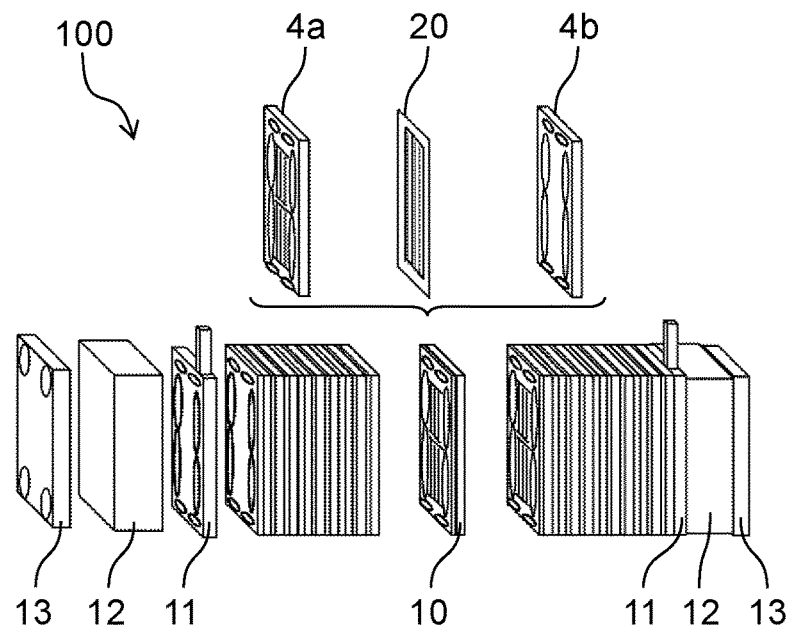
FIG. 1 is a schematic view showing a battery stack of a solid polymer fuel battery according to a first exemplary embodiment of the present disclosure.

In the fuel battery described in Japanese Patent Unexamined Publication No. 2010-218817, since a thickness h of the gas diffusion layer with respect to rib width Rw (2x in Japanese Patent Unexamined Publication No. 2010-218817) of the separator is large with h≥0.7 Rw, the amount of the reaction gas supplied to reach a catalyst is reduced, a diffusion overvoltage, particularly in a high current density region is increased, and power generation performance is deteriorated.

An object of the present disclosure is to provide a fuel battery with enhanced power generation performance by reducing a thickness of the gas diffusion layer with respect to a rib width of a separator to improve gas diffusivity particularly in a high current density region.

In order to achieve the object, as a result of the intensive studies, the inventors of the present disclosure found that the gas diffusivity in a thickness direction and a surface direction of the gas diffusion layer is made uniform by using the gas diffusion layer including conductive particles, conductive fibers, and a polymer resin, the gas diffusion layer having an average fiber length of the conductive fibers of smaller than ½ of the rib width of the separator, and an average fiber diameter of the conductive fibers of 1/100 or less of the thickness of the gas diffusion layer. From this finding, it was found that even if the thickness of the gas diffusion layer is reduced with respect to the rib width, the gas diffusion under the rib is less likely to be hindered, and the power generation performance is greatly improved particularly in the high current density region.

Hereinafter, a solid polymer fuel battery will be described as a specific exemplary embodiment of the fuel battery of the present disclosure with reference to the accompanying drawings. The fuel battery of the present disclosure is not limited to the configuration of the fuel battery to be described in the following exemplary embodiment, and includes a configuration of the fuel battery based on the technology which is equivalent to the technical idea having technical features to be described in the following exemplary embodiment.

The numerical values, shapes, configurations, manufacturing processes, order of manufacturing steps, and the like to be described in the following exemplary embodiments are examples, and the disclosure is not limited to the contents of the present disclosure. In components of the following exemplary embodiments, components, which are not described in independent claims representing the broadest concept, will be described as optional components. In exemplary embodiments, the same components may be denoted by the same reference numerals and description thereof may be omitted. For ease of understanding, components are schematically shown in the drawings.

First, various aspects of a fuel battery of the present disclosure will be illustrated.

A fuel battery of a first aspect according to the present disclosure is a fuel battery including a membrane-electrode assembly in which catalyst layers and gas diffusion layers are stacked on both sides of a polymer electrolyte membrane, and separators between which the membrane-electrode assembly is interposed, in which the separator includes a rib and a groove on a surface that is in contact with the gas diffusion layer for forming a gas flow path through which a reaction gas used for power generation flows, when a thickness of the gas diffusion layer is defined as h, and a width of a portion of the rib that is in contact with the gas diffusion layer is defined as Rw, 0.29 Rw≤h≤0.55 Rw is satisfied, the gas diffusion layer includes conductive particles, conductive fibers, and a polymer resin, and average fiber length Fl and average fiber diameter Fd of the conductive fibers satisfy Fl<Rw/2 and Fd<h/100.

The fuel battery of a second aspect according to the present disclosure is a fuel battery including a membrane-electrode assembly (MEA) in which catalyst layers and gas diffusion layers are stacked on both sides of a polymer electrolyte membrane, and separators between which the membrane-electrode assembly is interposed, in which the separator includes a rib and a groove on a surface that is in contact with the gas diffusion layer for forming a gas flow path through which a reaction gas used for power generation flows, when a thickness of the gas diffusion layer is defined as h, and a width of a portion of the rib that is in contact with the gas diffusion layer is defined as Rw, 0.29 Rw≤h≤0.48 Rw is satisfied, the gas diffusion layer includes conductive particles, conductive fibers, and a polymer resin, and average fiber length Fl and average fiber diameter Fd of the conductive fibers satisfy Fl<Rw/2 and Fd<h/100.

In the fuel battery of a third aspect according to the present disclosure, according to the first or the second aspect, average fiber length Fl and average fiber diameter Fd of the conductive fibers may satisfy 0.5 μm≤Fl≤50 μm and 0.05 μm≤Fd≤0.3 μm.

In the fuel battery of a fourth aspect according to the present disclosure, according to the third aspect, an amount of the conductive fibers in the gas diffusion layer may be larger than an amount of the conductive particles in the gas diffusion layer.

In the fuel battery of a fifth aspect according to the present disclosure, according to the fourth aspect, the gas diffusion layer may have a step at a boundary between the rib and the groove, and may be formed of an uneven surface in which a surface in contact with a top flat portion of the rib and a surface facing the groove are discontinuous.

In the fuel battery of a sixth aspect according to the present disclosure, according to the fifth aspect, a height of the step of the gas diffusion layer at the boundary between the rib and the groove may be 5 to 30 μm.

In the fuel battery of a seventh aspect according to the present disclosure, according to the sixth aspect, in the gas diffusion layer, surface roughness Sa on a surface side in contact with the separator may be less than 3 μm.

In the fuel battery of an eighth aspect according to the present disclosure, according to any one of the first to seventh aspects, rib width Rw and groove width Gw of the separator may satisfy 0.7 Gw≤Rw≤1.3 Gw.

In the fuel battery of a ninth aspect according to the present disclosure, according to any one of the first to eighth aspects, the gas diffusion layer and the separator may be on a cathode side.

According to the present disclosure, it is possible to provide a fuel battery in which the gas diffusion layer has sufficient gas permeability, and the power generation performance in the membrane-electrode assembly (MEA) is improved particularly in the high current density region.

Hereinafter, exemplary embodiments of the present disclosure will be described with reference to the drawings.

First Exemplary Embodiment

Referring to FIG. 1, a basic configuration of solid polymer fuel battery (hereinafter, simply referred to as fuel battery) 100 according to a first exemplary embodiment of the present disclosure will be described. FIG. 1 is a schematic view schematically showing a basic configuration (also referred to as a fuel battery stack) of fuel battery 100 of the first exemplary embodiment. The first exemplary embodiment is not limited to the solid polymer fuel battery, but can be applied to various fuel batteries.

Structure of Fuel Battery Stack

As shown in FIG. 1, the fuel battery stack of fuel battery 100 is formed by stacking one or more battery cells 10, which are basic units, and compressing and fastening battery cells 10 with a current collecting plate 11, insulating plate 12, and end plate 13 disposed on each side of stacked battery cell 10 with a predetermined load from both sides.

Current collecting plate 11 is formed of a conductive material with gas impermeability. For example, copper, brass, or the like is used for current collecting plate 11. Current collecting plate 11 is provided with a current extraction terminal portion (not shown), and a current is extracted from the current extraction terminal portion during power generation.

Insulating plate 12 is formed of an insulating material such as a resin. For example, a fluororesin, a PPS resin, or the like is used for insulating plate 12.

End plates 13 on both ends of fuel battery 100 hold one or more stacked battery cells 10, current collecting plate 11, and insulating plate 12 by fastening the one or more stacked battery cells 10, current collecting plate 11, and insulating plate 12 with a predetermined load by a pressurizing unit (not shown). For example, a metal material with high rigidity such as steel is used for end plate 13.

Figure 2:
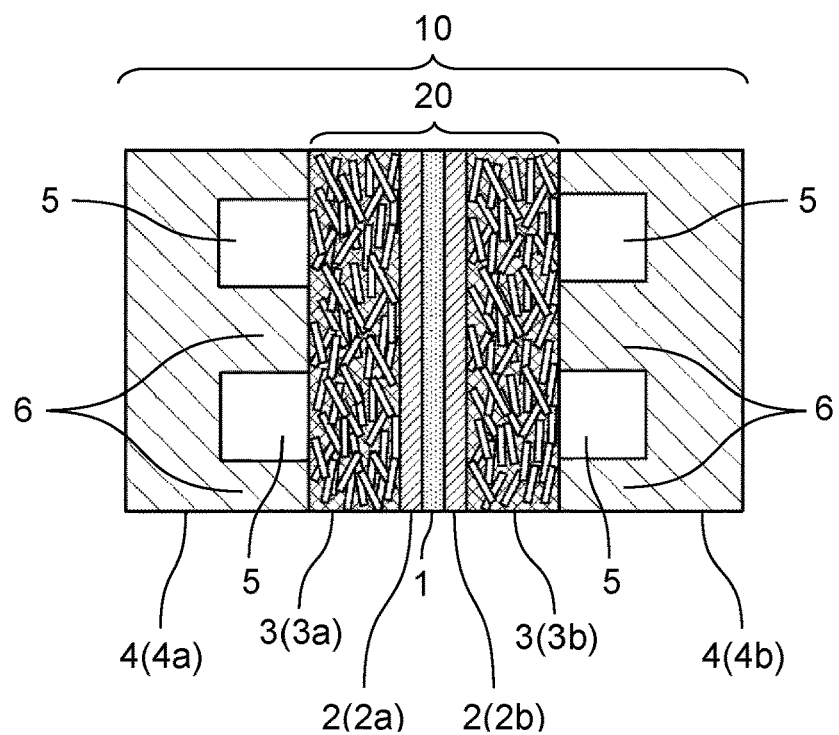
FIG. 2 is a cross-sectional view schematically showing a part of a battery cell of the solid polymer fuel battery according to the first exemplary embodiment of the present disclosure.

FIG. 2 is a cross-sectional view schematically showing a cross section of battery cell 10. In battery cell 10, membrane-electrode assembly (hereinafter, referred to as MEA) 20 is interposed between anode-side separator 4a and cathode-side separator 4b. In the following, anode-side separator 4a and cathode-side separator 4b are each referred to as separator 4. The similar description will be made for other components when a plurality of components are described together.

In separator 4, a gas flow path through which a reaction gas flows is formed on the surface that is in contact with gas diffusion layer 3. Grooves 5 and ribs 6 for forming the gas flow path are formed in separator 4. The space of groove 5 between ribs 6 formed in anode-side separator 4a serves as a gas flow path through which the reaction gas for fuel gas flows. Groove 5 between ribs 6 formed in cathode-side separator 4b serves as a gas flow path through which the reaction gas for oxidant gas flows. A carbon-based material or a metal-based material is used for separator 4.

MEA

MEA 20 has polymer electrolyte membrane 1, catalyst layer 2, and gas diffusion layer 3. Anode catalyst layer 2a and cathode catalyst layer 2b (anode-side and cathode-side catalyst layers 2a and 2b are each referred to as catalyst layer 2) are respectively formed on the two sides of polymer electrolyte membrane 1 selectively transporting protons, and anode-side gas diffusion layer 3a and cathode-side gas diffusion layer 3b (both gas diffusion layers 3a and 3b are each referred to as gas diffusion layer 3) are disposed on outer sides of anode catalyst layer 2a and cathode catalyst layer 2b, respectively. Gas diffusion layer 3 is in contact with a protruding end of rib 6 of separator 4.

For example, a perfluorocarbon sulfonic acid polymer is used as polymer electrolyte membrane 1, but polymer electrolyte membrane 1 is not particularly limited as long as it has proton conductivity.

As catalyst layer 2, a layer containing a carbon material carrying catalyst particles such as platinum and a polymer electrolyte can be used.

Gas Diffusion Layer

Figure 3A:
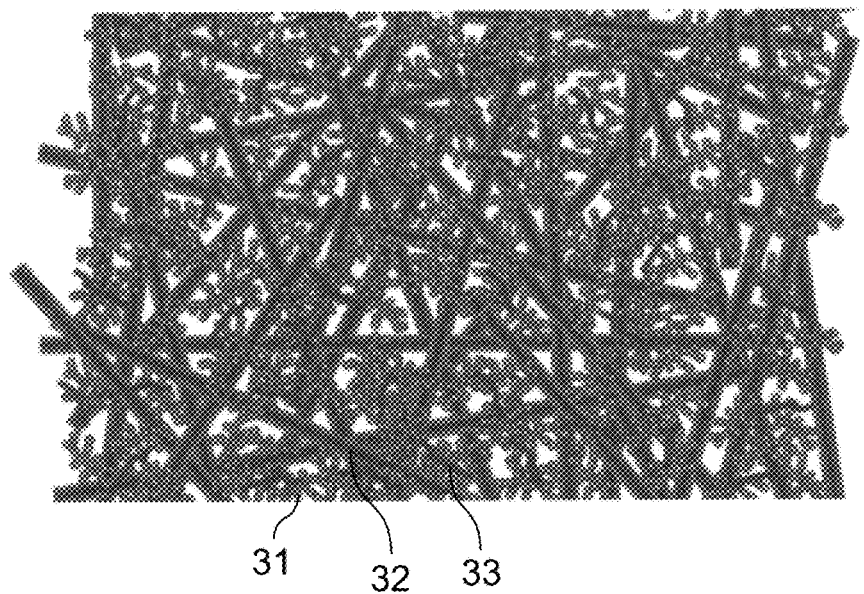
FIG. 3A is a cross-sectional view schematically showing a gas diffusion layer according to the first exemplary embodiment of the present disclosure.
Figure 3B:
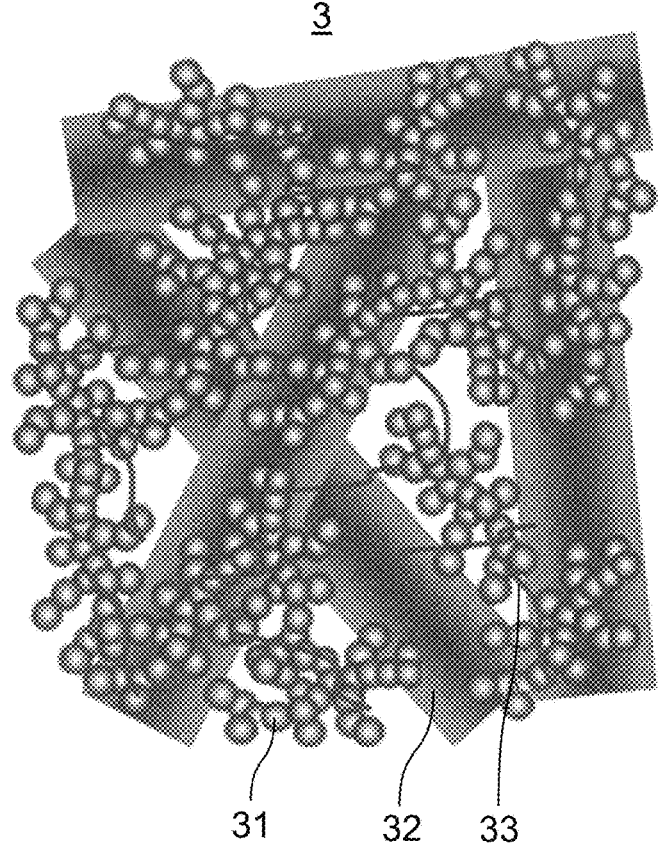
FIG. 3B is a cross-sectional view schematically showing an enlarged part of the gas diffusion layer according to the first exemplary embodiment of the present disclosure.

Next, a configuration of gas diffusion layer 3 (gas diffusion layer without base material) of fuel battery 100 according to the first exemplary embodiment of the present disclosure will be described in detail with reference to FIGS. 3A and 3B. FIG. 3A is a cross-sectional view schematically showing an enlarged cross section of the gas diffusion layer 3. FIG. 3B is a cross-sectional view schematically showing a further enlarged part of gas diffusion layer 3 shown in FIG. 3A. As shown in FIG. 3A, gas diffusion layer 3 in the first exemplary embodiment is a self-supporting membrane composed of conductive particles 31, conductive fibers 32, and polymer resin 33 and having a self-supporting structure.

Conductive particles 31 are particles having excellent electrical conductivity, and contribute to improving conductivity of gas diffusion layer 3. As a material of the conductive particles 31, for example, carbon particles are used.

Conductive fibers 32 contribute to improvement in conductivity and improvement in mechanical strength of gas diffusion layer 3. A material of conductive fiber 32 is not particularly limited, but examples thereof can include carbon fibers such as carbon nanotubes.

The present inventors have conducted various experiments on gas diffusion layer 3 in fuel battery 100, and found that preferable results can be obtained when average fiber length Fl and average fiber diameter Fd of conductive fibers 32 have the following relationship.

Average fiber length Fl and average fiber diameter Fd of conductive fibers 32 preferably satisfy $Fl<Rw/2$ and $Fd</100$, where a rib width of separator 4 is defined as Rw. When average fiber length Fl and average fiber diameter Fd satisfy $Fl<Rw/2$ and $Fd<h/100$, gas diffusivity in a thickness direction (horizontal direction in FIG. 2) and a surface direction (longitudinal direction in FIG. 2) of gas diffusion layer 3 is likely to be even. On the other hand, when average fiber length Fl and average fiber diameter Fd of conductive fibers 32 in gas diffusion layer 3 satisfy $Fl \geq R/2$ or $Fd \geq h/100$, anisotropy of the gas diffusivity in the thickness direction and the surface direction of gas diffusion layer 3 occurs. Particularly, if $Fd \geq h/100$, when a thickness of gas diffusion layer 3 is reduced, an area of conductive fiber 32 relative to a cross-sectional area of gas diffusion layer 3 in the surface direction increases and the gas diffusivity in the surface direction is reduced. As a result, the gas diffusion in gas diffusion layer 3 under the rib is reduced, and the cell voltage is lowered.

Average fiber length Fl of conductive fibers 32 is preferably 0.5 μm or more and 50 μm or less. When average fiber length Fl of conductive fibers 33 is 0.5 μm or more, it contributes more effectively to the improvement in the conductivity of gas diffusion layer 3, and the mechanical strength of gas diffusion layer 3 can be further enhanced. Further, when average fiber length Fl of conductive fiber 32 is 50 μm or less, the anisotropy of the gas diffusivity in the thickness direction and the surface direction of gas diffusion layer 3 can be minimized.

Average fiber diameter Fd of conductive fibers 32 is preferably 50 nm or more and 300 nm or less. When average fiber diameter Fd of conductive fibers 32 is 50 nm or more, it contributes more effectively to the improvement in the conductivity of gas diffusion layer 3, and the mechanical strength of gas diffusion layer 3 can be further enhanced, and thus gas diffusion layer 3 may have a sufficient strength as a self-supporting membrane. Further, when average fiber diameter Fd of conductive fibers 32 is 300 nm or less, the diameter is not too large. Therefore, when the thickness of gas diffusion layer 3 is reduced, it is possible to reduce an area ratio of conductive fibers 32 relative to the cross-sectional area in the surface direction and to sufficiently secure the gas diffusivity in the surface direction.

Examples of a material of polymer resin 33 can include polytetrafluoroethylene (PTFE), tetrafluoroethylene-hexafluoropropylene copolymer (FEP), polyvinylidene fluoride (PVDF), tetrafluoroethylene-ethylene copolymer (ETFE), polychlorotrifluoroethylene (PCTFE), and polyfluoroethylene-perfluoroalkyl vinyl ether copolymer (PFA). In particular, from the viewpoint of heat resistance, water repellency, and chemical resistance, polymer resin 33 preferably contains PTFE. Examples of a raw material form of PTFE can include a dispersion form or a powdered form, and the dispersion form is preferably used from the viewpoint of having excellent dispersibility.

Polymer resin 33 functions as a binder that binds conductive particles 31 to each other. Further, polymer resin 33 has water repellency. As a result, it is possible to prevent water from staying in the fine pores inside gas diffusion layer 3 to hinder gas permeation is hindered.

An amount (wt %) of conductive fibers 32 in gas diffusion layer 3 is preferably larger than an amount (wt %) of conductive particles 31. The reason will be explained. Gas diffusion layer 3 serves to discharge excessive water to the outside through fine pores in gas diffusion layer 3, while holding water produced by the reaction with the gas diffusivity. The excess water passes through the fine pores inside gas diffusion layer 3 as water vapor, but water vapor cannot sufficiently permeate when the pore diameter is in the order of several tens of nm. Therefore, the excess water in membrane-electrode assembly (MEA) 20 is not discharged, gas diffusion into catalyst layer 2 is hindered, and battery performance is deteriorated. On the other hand, when the fine pores are in the order of microns, the water vapor permeates too much, the inside of MEA 20 becomes dry, proton conductivity is lowered, and the battery performance is deteriorated. Therefore, the pore diameter inside gas diffusion layer 3 is suitably in an order of 0.1 µm. Fine pores in an order of 0.1 µm are easily formed by a gap between conductive fibers 32, and fine pores having a diameter of several tens of nm are easily formed by a gap between primary particles of conductive particles. Therefore, since the amount (wt %) of conductive fibers 32 is larger than the amount (wt %) of conductive particles 31, the fine pores in gas diffusion layer 3 are in an order of 0.1 µm and the battery performance is improved. Further, in gas diffusion layer 3, conductive particles 31 are present in the gap between conductive fibers 32, and fibrous polymer resin 33 can satisfactorily bind conductive fibers 32 and conductive particles 31, and therefore, gas diffusion layer 3 can have a sufficient strength.

Battery Cell

Figure 4:
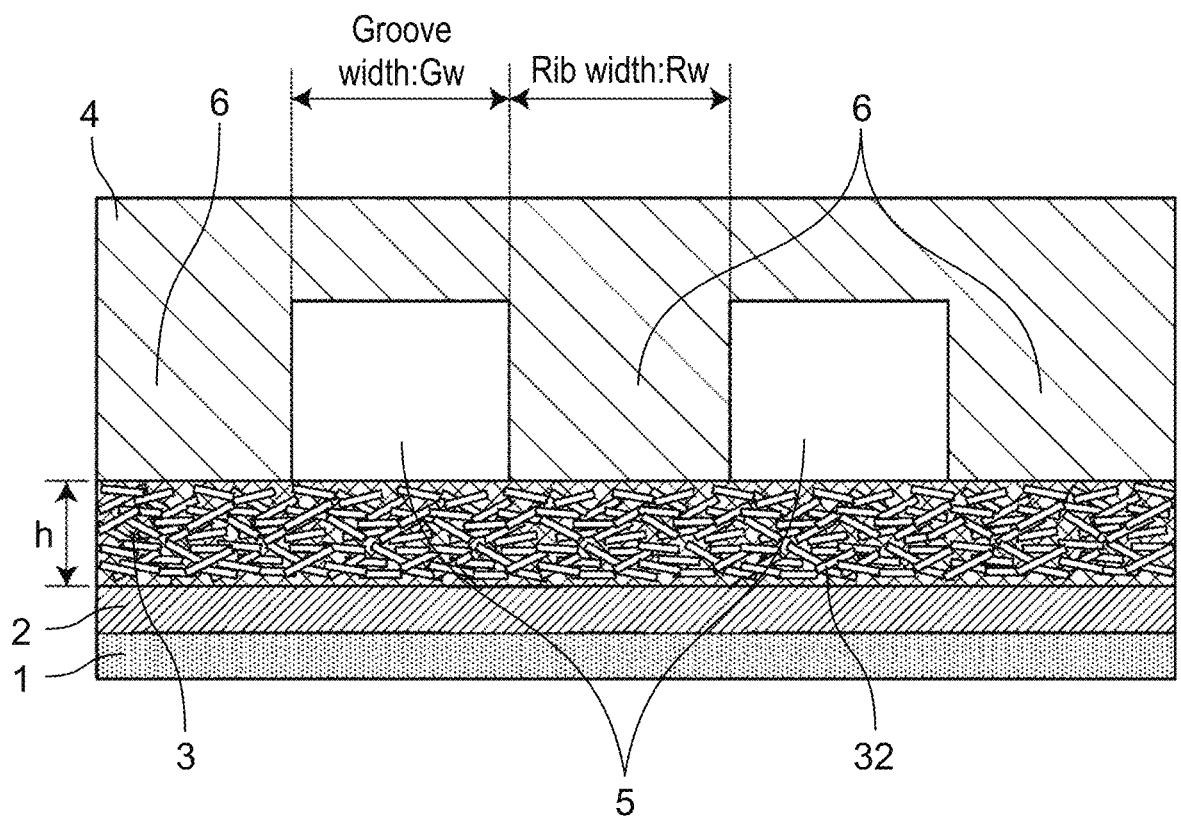
FIG. 4 is a cross-sectional view schematically showing a part of the battery cell of the solid polymer fuel battery according to the first exemplary embodiment of the present disclosure.

Next, a configuration of battery cell 10 of fuel battery 100 according to the first exemplary embodiment of the present disclosure will be described in detail with reference to FIG. 4. FIG. 4 is a cross-sectional view schematically showing the configuration of polymer electrolyte membrane 1, catalyst layer 2, gas diffusion layer 3, and separator 4 on the cathode side of battery cell 10. In FIG. 4, a contact portion between separator 4 (4b) and gas diffusion layer 3 (3b) is enlarged. In gas diffusion layer 3 shown in FIG. 4, only conductive fibers 32 are shown, and conductive particles 31 and polymer resin 33 shown in FIG. 3 are omitted. FIG. 4 shows the configuration of battery cell 10 on the cathode side, but the configuration of battery cell 10 on the anode side may be the same.

As described above, separator 4 includes grooves 5 and ribs 6 on a surface that comes into contact with gas diffusion layer 3 for forming a gas flow path through which a reaction gas flows. When the width of rib 6 is defined as Rw, the width of groove 5 is defined as Gw, and the thickness of the gas diffusion layer is defined as h, Condition (1) 0.29 Rw≤h≤0.55 Rw is satisfied, and more preferably, Condition (1') 0.29 Rw≤h≤0.48 Rw is satisfied. Further, average fiber length Fl of conductive fibers 32 of gas diffusion layer 3 satisfies Condition (2) Fl<Rw/2, and average fiber diameter Fd of the conductive fibers satisfies Condition (3) Fd<h/100. Here, the width Rw of rib 6 and the width Gw of groove 5 are a width of rib 6 and a width of groove 5 in the cross section in a direction orthogonal to the main flow direction of the reaction gas, respectively. Further, the thickness h of gas diffusion layer 3 was measured using a Digimatic Indicator manufactured by Mitutoyo Corporation, and the thickness of the single gas diffusion layer was measured.

In a configuration of the first exemplary embodiment, a relationship between rib width Rw and groove width Gw of separator 4 is preferably 0.7 Gw≤Rw≤1.3 Gw. When the relationship between rib width Rw and groove width Gw of separator 4 is 0.7 Gw>Rw, the contact area between rib 6 and gas diffusion layer 3 is reduced, and thus electron resistance increases and the cell voltage is lowered. On the other hand, when Rw>1.3 Gw, the reaction gas in a region of catalyst layer 2 facing rib 6 is reduced, and the cell voltage is lowered. Furthermore, since a cross-sectional area orthogonal to the main flow direction of the reaction gas in groove 5 is reduced, the pressure loss of the reaction gas increases, and particularly, a load of auxiliary equipment increases on the cathode side.

By satisfying all Conditions (1) to (3) above, it is possible to reduce the thickness h of gas diffusion layer 3 with respect to rib width Rw of separator 4, it is possible to realize dramatic improvement in gas diffusivity and improvement in battery performance particularly, in the high current density region. The following points are considered as the reason thereof.

A path for diffusing the reaction gas reaching catalyst layer 2 is longer in the region of catalyst layer 2 facing rib 6 and thus the amount of the gas is reduced than in the region of catalyst layer 2 facing groove 5. Furthermore, gas diffusion layer 30 in the related art (gas diffusion layer with base material: see FIG. 6) forms a microporous layer (MPL) on the base material of the carbon fiber. Since average fiber length Fl of the carbon fiber base material forming the base material is about 10 mm, and average fiber diameter Fd of the carbon fiber base material forming the base material is about 10 µm, gas diffusivity in the surface direction is worse than gas diffusivity in the thickness direction. Therefore, in the battery cell in the related art, by increasing the thickness h of the gas diffusion layer by a certain thickness with respect to rib width Rw, the battery cell in the related art is configured so that the gas easily reaches the region of catalyst layer 2 facing rib 6.

In contrast, in the configuration of battery cell 10 in the first exemplary embodiment of the present disclosure, average fiber length Fl of conductive fibers 32 constituting gas diffusion layer 3 is small and average fiber diameter Fd is extremely small with respect to the thickness h of gas diffusion layer 3, such that the anisotropy of the gas diffusion in the thickness direction and the surface direction is reduced. As a result, even if the thickness h of gas diffusion layer 3 is reduced, it is possible to secure an amount of gas permeated into the region of catalyst layer 2 facing rib 6. Further, since the thickness h of gas diffusion layer 3 is reduced, the amount of gas permeated into the region of catalyst layer 2 facing groove 5 also increases.

When 0.29 Rw>h without satisfying Condition (1), the amount of gas permeated into the region of catalyst layer 2 facing rib 6 decreases and the cell voltage is lowered. In contrast, when h≥0.55 Rw, the thickness h of gas diffusion layer 3 becomes larger, the amounts of gas permeated into the regions of catalyst layer 2 facing groove 5 and rib 6, respectively, decreases and the cell voltage is lowered.

When Fl≥Rw/2 and Fd≥h/100 without satisfying Conditions (2) and (3), as described above, anisotropy of the gas diffusivity in the thickness direction and the surface direction of gas diffusion layer 3 occurs, and thus the amount of gas permeated into the region of the catalyst layer 2 facing rib 6 decreases, and the cell voltage decreases.

Second Exemplary Embodiment

Next, a configuration of a battery cell of a fuel battery according to a second exemplary embodiment of the present disclosure will be described in detail with reference to FIGS. 5A and 5B.

Hereinafter, in the description of the fuel battery of the second exemplary embodiment, the difference from the first exemplary embodiment will be mainly described. In the description of the second exemplary embodiment, the same reference numerals are given to the elements having the same functions and configurations as those of the first exemplary embodiment, and the description thereof will be omitted. Further, the description of the content having the same effect as that of the first exemplary embodiment will be omitted.

Figure 5A:
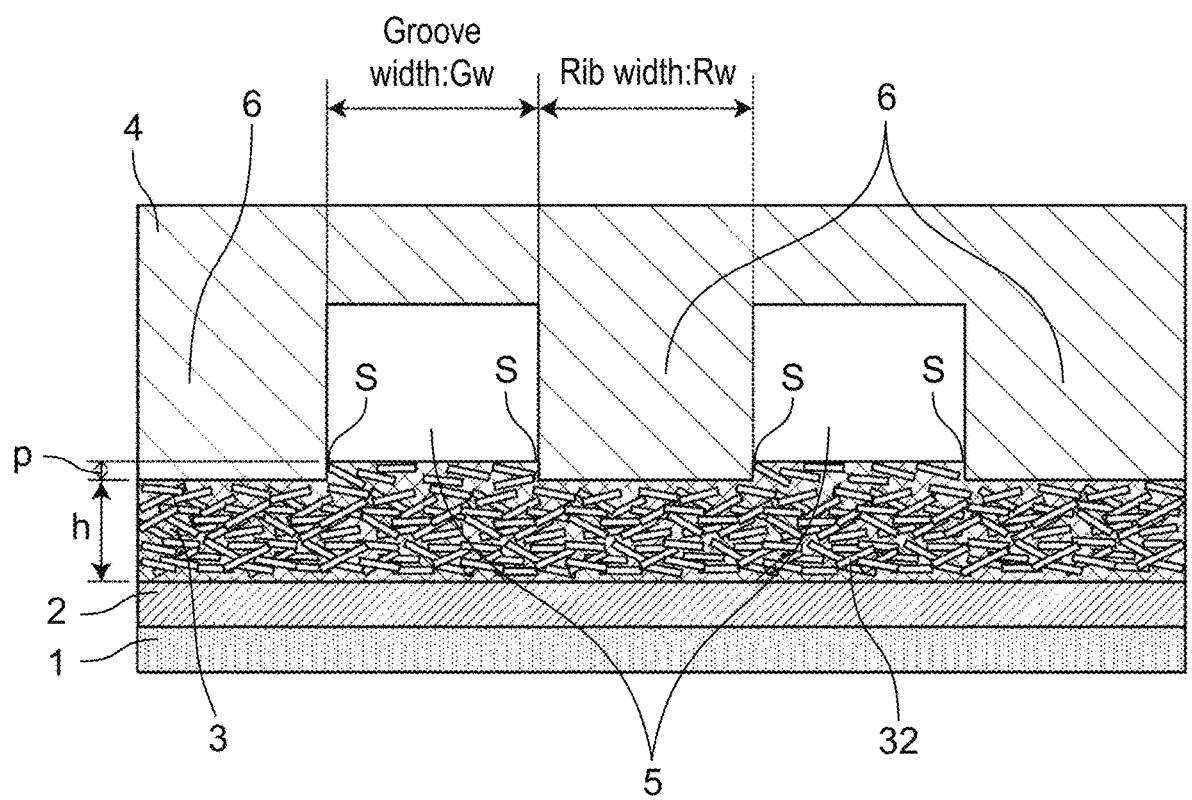
FIG. 5A is a cross-sectional view schematically showing a part of a battery cell of a solid polymer fuel battery according to a second exemplary embodiment of the present disclosure.

FIG. 5A is a cross-sectional view schematically showing the configuration of polymer electrolyte membrane 1, catalyst layer 2, gas diffusion layer 3, and separator 4 on the cathode side of battery cell 10. FIG. 5A schematically shows an enlarged contact portion between separator 4 and gas diffusion layer 3. In gas diffusion layer 3 shown in FIG. 5A, only conductive fibers 32 are shown, and conductive particles 31 and polymer resin 33 are omitted. FIG. 5A shows the configuration of battery cell 10 on the cathode side, but the configuration of battery cell 10 on the anode side may be the same.

As shown in FIG. 5A, when the width of rib 6 of separator 4 is defined as Rw, the width of groove 5 is defined as Gw, and the thickness of the gas diffusion layer is defined as h, Condition (1) 0.29 Rw≤h≤0.55 Rw is satisfied, and more preferably, Condition (1') 0.29 Rw≤h≤0.48 Rw is satisfied. Further, average fiber length Fl of conductive fibers 32 of gas diffusion layer 3 satisfies Condition (2) Fl<Rw/2, and average fiber diameter Fd of the conductive fibers satisfies Condition (3) Fd<h/100.

Figure 5B:
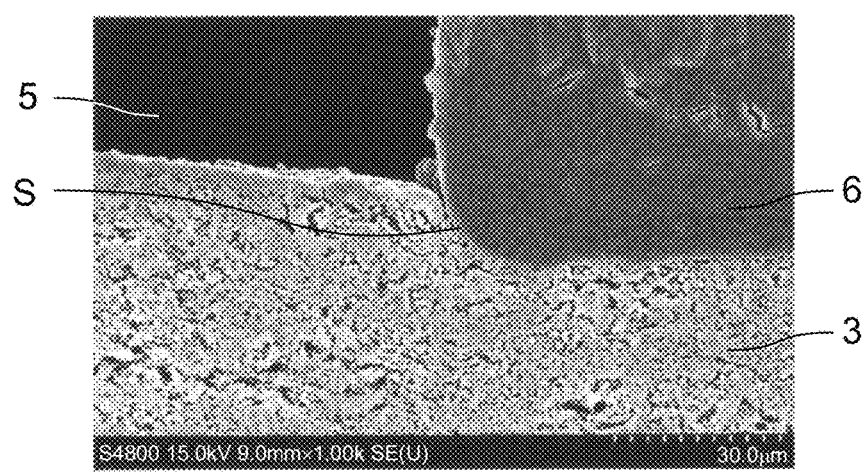
FIG. 5B is an SEM photograph of a cross section of an enlarged part of the battery cell according to the second exemplary embodiment of the present disclosure.

FIG. 5B is an SEM photograph of an enlarged cross section of the battery cell according to the second exemplary embodiment in which rib 6 of separator 4 is in contact with gas diffusion layer 3. As can be understood from the photograph of FIG. 5B, the protruding end of rib 6 is in contact with gas diffusion layer 3 so as to be embedded in gas diffusion layer 3, and the protruding end of rib 6 is surely in contact with gas diffusion layer 3 together with a side surface thereof. That is, gas diffusion layer 3 protrudes into groove 5, and a boundary surface of rib 6 and groove 5 with gas diffusion layer 3 is a discontinuous surface having step S.

As described above, gas diffusion layer 3 of the second exemplary embodiment has step S at the boundary between groove 5 and rib 6 of separator 4, and is formed of an uneven surface in which a surface in contact with a top flat portion of rib 6 of separator 4 and a surface facing groove 5 of separator 4 is discontinuous. Accordingly, gas diffusion layer 3 protrudes into groove 5 with respect to the boundary surface between gas diffusion layer 3 and rib 6. Protruding amount p, which is a height of step S of gas diffusion layer 3 at the boundary between groove 5 and rib 6 of separator 4, is 5 to 30 μm.

Figure 6:
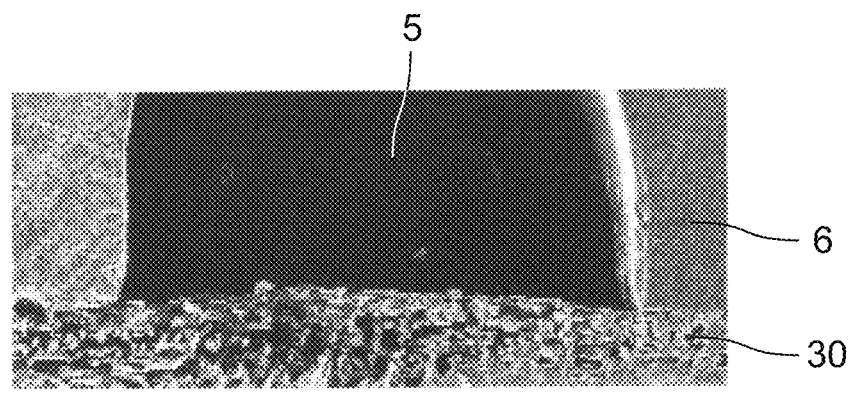
FIG. 6 is an SEM photograph of a cross section of an enlarged part of a battery cell using a gas diffusion layer in the related art.

FIG. 6 is an SEM photograph of a cross section of the battery cell using gas diffusion layer 30 in the related art, showing that rib 6 of separator 4 is in contact with gas diffusion layer 30. In gas diffusion layer 30 in the related art used here, average fiber length Fl of the carbon fiber base material forming the base material is about 10 mm, average fiber diameter Fd of the carbon fiber base material forming the base material is about 10 μm, and thus long and thick carbon fibers are used in the carbon fiber base material. As is clear from the photograph of FIG. 6, gas diffusion layer 30 in the related art has a configuration in which only the protruding end of rib 6 is in plane contact with gas diffusion layer 30 in the related art without the step at the boundary between rib 6 and groove 5. This is because long and thick carbon fibers having average fiber length Fl of about 10 mm and average fiber diameter Fd of about 10 μm are used in the carbon fiber base material forming the base material of gas diffusion layer 30 in the related art.

In battery cell 10 according to the second exemplary embodiment, step S is formed at the boundary between rib 6 and groove 5 so that gas diffusion layer 3 enters into groove 5, and protruding amount as the height of step S is 5 to 30 μm. As described above, in the configuration of the second exemplary embodiment, gas diffusion layer 3 has step S at the boundary between rib 6 and groove 5, the protruding end of rib 6 is in contact with gas diffusion layer 3 so as to be embedded into gas diffusion layer 3, and the side surface of protruding end of rib 6 is also in contact with gas diffusion layer 3. As a result, in the configuration of the battery cell according to the second exemplary embodiment, adhesion between gas diffusion layer 3 and rib 6 can be improved to reduce contact resistance. If the protruding amount p (height of step S) of gas diffusion layer 3 into groove 5 is smaller than 5 μm, the effect of reducing the contact resistance is reduced. On the other hand, when the protruding amount p of gas diffusion layer 3 into groove 5 is larger than 30 μm, a depth of groove 5 is generally about 100 to 300 μm. Therefore, the cross-sectional area of the gas flow path formed by groove 5 is reduced, thereby increasing pressure loss of the reaction gas.

Further, surface roughness Sa of the surface of gas diffusion layer 3 in contact with rib 6 is preferably 3 μm or less. When surface roughness Sa is 3 μm or less, the contact property between gas diffusion layer 3 and rib 6 is improved, and the contact resistance can be further reduced.

In the above exemplary embodiment, the configuration of the battery cell on the cathode side has been described, but a configuration of the battery cell on the anode side can be the same as the configuration of the battery cell on the cathode side. In the gas diffusion layer included in the fuel battery, oxygen used as an oxidant gas is less likely to diffuse than hydrogen used as a fuel gas. Therefore, it is preferable that the fuel battery of the present disclosure is applied as at least the configuration on the cathode side.

The fuel battery of the present disclosure is not limited to contents described in the above exemplary embodiments, and can be implemented in various other aspects.

Examples and Comparative Examples

Hereinafter, specific configurations and manufacturing methods of the fuel battery of the present disclosure in Examples and Comparative Examples where the present inventor conducted an experiment will be described.

A: Gas diffusion layer without base material
Material
Conductive Particle
Granular Denka Black (registered trademark) (produced by Denka Company Limited.
Conductive Fiber
VGCF (registered trademark) (Showa Denko K.K, VGCF-H)
Polymer Resin
Polyflon PTFE D series (produced by Daikin Industries, Ltd.), average particle size: 0.25 μm
Manufacturing Method of Gas Diffusion Layer without Base Material A gas diffusion layer without a base material was manufactured at a ratio of 20 wt % of the conductive particles, 50 wt % of the conductive fibers, and 30 wt % of the polymer resins.

First, conductive particles, conductive fiber, a surfactant, and a dispersion solvent were mixed, and kneaded using a planetary mixer. Next, a polymer resin was added to the kneaded mixture, and the mixture was further kneaded using a planetary mixer. Next, the kneaded product was rolled five times using a rolling machine under a condition of rolling at 0.1 ton/cm. Thereafter, the rolled sheet was placed in an IR furnace and fired at 300° C. for 0.5 hours. The fired sheet was rerolled three times using a roll press machine under a condition of rolling at 1 ton/cm to obtain a gas diffusion layer having a thickness described in the following Table 1.

B: Gas diffusion layer with base material
Material
Base Material
TORAYCA (registered trademark), carbon paper (TGP-H-030, produced by Toray Industries, Inc.)
Conductive Particle
Granular Denka Black (registered trademark) (produced by Denka Company Limited.
Polymer Resin
Polyflon PTFE D series (produced by Daikin Industries, Ltd.), average particle size: 0.25 μm
Manufacturing Method of Gas Diffusion Layer with Base Material As the MPL layer, 80 wt % of conductive particles and 20 wt % of polymer resin were mixed with a surfactant and a dispersion solvent to prepare ink using a planetary mixer. The ink was applied to the base material with a spray coating machine to obtain a gas diffusion layer having a thickness of 165 μm.

C: Separator
Material
Carbon Plate Material
Carbon plate (manufactured by Tokai Carbon Co., Ltd.) G347B
Manufacturing of Separator The carbon plate material was cut to obtain a separator having a gas flow path with a rib width and a groove width shown in the table.

D: Fuel Battery

The fuel batteries of Examples 1 to 3 shown in Table 1 and Comparative Examples 1 and 2 shown in Table 2, which will be described later, were manufactured by the following methods.

(1) Preparation of Dispersion for Cathode Catalyst Layer

A dispersion for the cathode catalyst layer was prepared as follows. A particulate conductive member (carbon black) carrying catalyst particles (Pt—Co alloy) was added to an appropriate amount of water, and stirring is performed to disperse the mixture. After adding an appropriate amount of ethanol while stirring the obtained dispersion, 35 parts by mass of a fibrous conductive member (first fibrous conductive member) (gas-phase growth carbon fiber, average diameter: 150 nm, average fiber length: 10 μm) with respect to 100 parts by mass of the particulate conductive member carrying the catalyst particles, and 100 parts by mass of a proton conductive resin (perfluorocarbon sulfonic acid polymer) were added and stirred, to prepare a catalyst dispersion for a cathode catalyst layer.

(2) Preparation of Dispersion for Anode Catalyst Layer

A dispersion for the anode catalyst layer was prepared as follows. A particulate conductive member (carbon black) carrying catalyst particles (Pt) was added to an appropriate amount of water, and stirring is performed to disperse the mixture. After adding an appropriate amount of ethanol while stirring the obtained dispersion, 35 parts by mass of a fibrous conductive member (first fibrous conductive member) (gas-phase growth carbon fiber, average diameter: 150 nm, average fiber length: 10 μm) with respect to 100 parts by mass of the particulate conductive member carrying the catalyst particles, and 120 parts by mass of a proton conductive resin (perfluorocarbon sulfonic acid polymer) were added and stirred, to prepare a catalyst dispersion for an anode catalyst layer.

Production of CCM

In production of a catalyst coated membrane (CCM), two PET sheets were provided, the obtained catalyst dispersion for a cathode catalyst layer was applied to a smooth surface of one PET sheet in a uniform thickness, and the obtained catalyst dispersion for an anode catalyst layer was applied to a smooth surface of the other PET sheet in a uniform thickness, using a screen printing method. Then, the PET sheets were dried to form two catalyst layers on both sides of the polymer electrolyte membrane. A thickness of the cathode catalyst layer was 6 μm, and a thickness of the anode catalyst layer was 4.5 μm.

Producing of Single Cell

In production of a single cell, the above gas diffusion layer with base materials was used as an anode-side gas diffusion layer.

The gas diffusion layers of Examples 1 to 7 and Comparative Examples 1 and 5 were bonded to the cathode catalyst layer as a cathode-side gas diffusion layer. In addition, an anode-side gas diffusion layer was bonded to the anode catalyst layer. As a result, an MEA was obtained.

Next, a fuel battery was manufactured using a separator having a rib width of 0.5 mm and a groove width of 0.5 mm as an anode-side separator, and a separator having a rib width of 0.5 mm and a groove width of 0.5 mm as a cathode-side separator. First, the manufactured MEA was interposed between an anode-side separator having a fluid flow path for fuel gas supply and a cooling water flow path and a cathode-side separator having a gas flow path for oxidant gas supply, and a gasket made of a fluororubber is disposed around the cathode and anode, thereby manufacturing a single cell. An area of an effective electrode (anode or cathode) was 36 cm². The single cell was used as a test piece.

Evaluation Test of Examples 1 to 3 and Comparative Examples 1 and 2

The following evaluation test was carried out for Examples 1 to 3 and Comparative Examples 1 and 2. Table 1 shows the results of the evaluation test of Examples 1 to 3 and Comparative Examples 1 and 2 (see FIG. 9). The cell voltage, the diffusion overvoltage, and the resistance overvoltage in the evaluation test were measured as follows. In Table 1, the gas diffusion layer is referred to as GDL.

Cell Voltage

The cell voltage was measured under the following conditions. A cell temperature of a single cell was controlled to 75° C., a hydrogen gas as a fuel gas was supplied to the gas flow path on the anode side, and air was supplied to the gas flow path on the cathode side. Hydrogen gas stoichiometry was 1.5 and air stoichiometry was 1.8. Both the fuel gas and the air were humidified so that dew points thereof were 75° C., and then supplied to the single cell. The current density was held for three minutes every 0.5 A/cm$^2$ from 0 A/cm$^2$ to 2.0 A/cm$^2$, thereby measuring the cell voltage at 2.0 A/cm$^2$, and a normalized value based on the cell voltage of Comparative Example 1 was recorded.

Diffusion Overvoltage

A diffusion overvoltage at 2.0 A/cm$^2$ was measured under the same condition as the above cell voltage measurement, and a normalized value based on the diffusion overvoltage of Comparative Example 1 was recorded.

Resistance Overvoltage

A resistance overvoltage at 2.0 A/cm$^2$ was measured under the same condition as the above cell voltage measurement, and a normalized values based on the resistance overvoltage of Comparative Example 1 was recorded.

Figure 7:
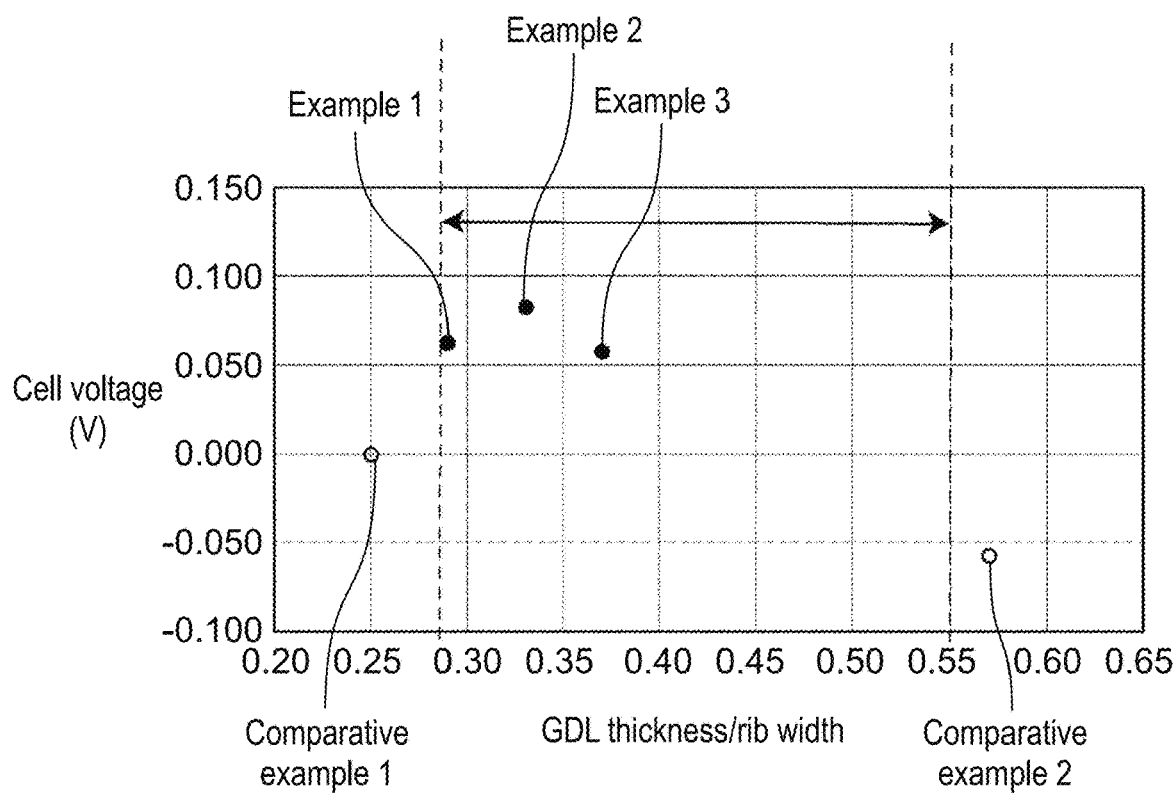
FIG. 7 is a graph showing results of evaluation tests of Examples 1 to 3 and Comparative Examples 1 and 2 for a cell voltage and thickness (h)/rib width (Rw) of a gas diffusion layer.

As shown in Table 1, in the fuel batteries of Examples 1 to 3, the thickness h of the gas diffusion layer and rib width Rw of the separator satisfy 0.29 Rw≤h≤0.55 Rw, and average fiber length Fl of the conductive fibers of the gas diffusion layer satisfies Fl<Rw/2. Therefore, when a separator having the same rib width Rw is used, it could be confirmed that the cell voltage is higher and the diffusion overvoltage is lower in the configurations of Examples 1 to 3 as compared with Comparative Examples 1 and 2 shown in Table 1. FIG. 7 is a plot of the results of the evaluation test of Examples 1 to 3 and Comparative Examples 1 and 2 for the cell voltage and thickness h/rib width Rw of the gas diffusion layer.

As described above, the fuel battery of the present disclosure has sufficient gas permeability in the gas diffusion layer, and the power generation performance in the membrane-electrode assembly (MEA) in particular in the high current density region is improved.

Evaluation Test of Examples 4 to 7 and Comparative Examples 3 to 5

In the evaluation test of Examples 4 to 7, a single cell was prepared and the battery was evaluated in the same manner as in Examples 1 to 3 described above. The only difference from Examples 1 to 3 is that a separator having a rib width of 0.3 mm and a groove width of 0.3 mm is used as the cathode-side separator. Table 2 shows the results of the evaluation test of Examples 4 to 7 and Comparative Examples 3 to 5 (see FIG. 10).

Figure 8:
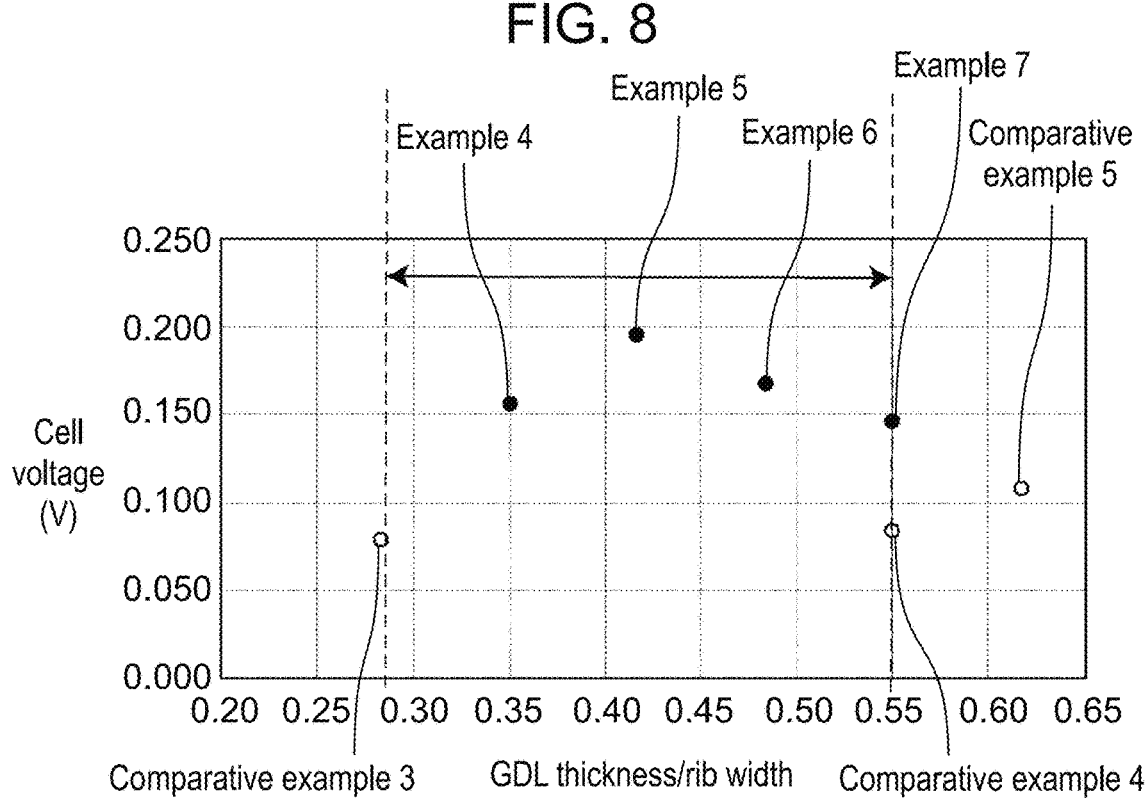
FIG. 8 is a graph showing results of evaluation tests of Examples 4 to 7 and Comparative Examples 3 to 5 for a cell voltage and thickness (h)/rib width (Rw) of a gas diffusion layer.

As shown in Table 2, in the fuel batteries of Examples 4 to 7, the thickness h of the gas diffusion layer and rib width Rw of the separator satisfy 0.29 Rw≤h≤0.55 Rw, and average fiber length Fl of the conductive fibers of the gas diffusion layer satisfies Fl<Rw/2. Therefore, when a separator having the same rib width Rw is used, it could be confirmed that the cell voltage is higher and the diffusion overvoltage is lower in the configurations of Examples 4 to 7 as compared with Comparative Examples 3 to 5 shown in Table 2. FIG. 8 is a plot of the results of the evaluation test of Examples 4 to 7 and Comparative Examples 3 to 5 for the cell voltage and thickness h/rib width Rw of the gas diffusion layer.

As described above, the fuel battery of the present disclosure has sufficient gas permeability in the gas diffusion layer, and the power generation performance in the membrane-electrode assembly (MEA) in particular in the high current density region is improved.

While the invention has been described in certain detail with reference to the specific exemplary embodiments thereof, the contents of the disclosure of the preferred exemplary embodiments may be modified in the detailed structures thereof, and the combinations of the respective components and changes in the orders can be made therein without departing from the spirit and scope of the claims of the present disclosure.

The fuel battery of the present disclosure can be applied to applications such as a home cogeneration system, a vehicle fuel battery, a mobile fuel battery, and backup fuel battery.

What is claimed is:

1. A fuel battery comprising:
   a membrane-electrode assembly including a first catalyst layer and a first gas diffusion layer stacked on a first surface of a polymer electrolyte membrane, and a second catalyst layer and a second gas diffusion layer stacked on a second surface of the polymer electrolyte membrane;
   a first separator; and
   a second separator,
   wherein:
   the first surface of the polymer electrolyte membrane is opposite to the second surface of the polymer electrolyte membrane;
   the membrane-electrode assembly is interposed between the first separator and the second separator;
   the first separator includes a first rib and a first groove on a surface that is in contact with the first gas diffusion layer, the first rib and the first groove defining a first gas flow path through which a first reaction gas to be used for power generation is to flow;
   a thickness of the first gas diffusion layer is defined as h, and a width of a portion of the first rib that is in contact with the first gas diffusion layer is defined as Rw such that 0.29 Rw≤h≤0.55 Rw is satisfied;
   the second separator includes a second rib and a second groove on a surface that is in contact with the second gas diffusion layer, the second rib and the second groove defining a second gas flow path through which a second reaction gas to be used for power generation is to flow;
   the first gas diffusion layer includes conductive particles, conductive fibers, and a polymer resin;
   an average fiber length Fl of the conductive fibers in the first gas diffusion layer and an average fiber diameter Fd of the conductive fibers in the first gas diffusion layer satisfy Fl<Rw/2 and Fd<h/100; and
   the rib width Rw of the first separator and a groove width Gw of the first separator satisfy 0.7 Gw≤Rw≤1.3 Gw.

2. A fuel battery comprising:
   a membrane-electrode assembly including a first catalyst layer and a first gas diffusion layer stacked on a first surface of a polymer electrolyte membrane, and a second catalyst layer and a second gas diffusion layer stacked on a second surface of the polymer electrolyte membrane;
   a first separator; and
   a second separator, wherein:
the first surface of the polymer electrolyte membrane is opposite to the second surface of the polymer electrolyte membrane;
the membrane-electrode assembly is interposed between the first separator and the second separator;
the first separator includes a first rib and a first groove on a surface that is in contact with the first gas diffusion layer, the first rib and the first groove defining a first gas flow path through which a first reaction gas to be used for power generation is to flow;
a thickness of the first gas diffusion layer is defined as h, and a width of a portion of the first rib that is in contact with the first gas diffusion layer is defined as Rw such that $0.29\ Rw \leq h \leq 0.48\ Rw$ is satisfied;
the second separator includes a second rib and a second groove on a surface that is in contact with the second gas diffusion layer, the second rib and the second groove defining a second gas flow path through which a second reaction gas to be used for power generation is to flow;
the first gas diffusion layer includes conductive particles, conductive fibers, and a polymer resin;
an average fiber length Fl of the conductive fibers in the first gas diffusion layer and an average fiber diameter Fd of the conductive fibers in the first gas diffusion layer satisfy $Fl < Rw/2$ and $Fd < h/100$; and
the rib width Rw of the first separator and a groove width Gw of the first separator satisfy $0.7\ Gw < Rw < 1.3\ Gw$.

3. The fuel battery of claim 1,
wherein the average fiber length Fl of the conductive fibers in the first gas diffusion layer and the average fiber diameter Fd of the conductive fibers in the first gas diffusion layer satisfy $0.5\ \mu m \leq Fl \leq 50\ \mu m$ and $0.05\ \mu m \leq Fd \leq 0.3\ \mu m$.

4. The fuel battery of claim 3,
wherein an amount of the conductive fibers in the first gas diffusion layer is larger than an amount of the conductive particles in the first gas diffusion layer.

5. The fuel battery of claim 4, wherein:
the first gas diffusion layer has a first step at a boundary between the first rib and the first groove, and is defined by an uneven surface in which a surface in contact with a top flat portion of the first rib and a surface facing the first groove are discontinuous; and
the second gas diffusion layer has a second step at a boundary between the second rib and the second groove, and is defined by an uneven surface in which a surface in contact with a top flat portion of the second rib and a surface facing the second groove are discontinuous.

6. The fuel battery of claim 5, wherein:
a height of the first step is 5 μm to 30 μm; and
a height of the second step is 5 μm to 30 μm.

7. The fuel battery of claim 6, wherein:
in the first gas diffusion layer, a surface roughness Sa on a side in contact with the first separator is 3 μm or less; and
in the second gas diffusion layer, a surface roughness Sa on a side in contact with the second separator is 3 μm or less.

8. The fuel battery of claim 1,
wherein the first gas diffusion layer and the first separator are on a cathode side.

9. The fuel battery of claim 1,
wherein a thickness of the second gas diffusion layer is defined as h, and a width of a portion of the second rib that is in contact with the second gas diffusion layer is defined as Rw such that $0.29\ Rw \leq h \leq 0.55\ Rw$ is satisfied.

10. The fuel battery of claim 1, wherein:
the second gas diffusion layer includes conductive particles, conductive fibers, and a polymer resin; and
an average fiber length Fl of the conductive fibers in the second gas diffusion layer and an average fiber diameter Fd of the conductive fibers in the second gas diffusion layer satisfy $Fl < Rw/2$ and $Fd < h/100$.

11. The fuel battery of claim 10,
wherein the average fiber length Fl of the conductive fibers in the second gas diffusion layer and the average fiber diameter Fd of the conductive fibers in the second gas diffusion layer satisfy $0.5\ \mu m \leq Fl \leq 50\ \mu m$ and $0.05\ \mu m < Fd \leq 0.3\ \mu m$.

12. The fuel battery of claim 11,
wherein an amount of the conductive fibers in the second gas diffusion layer is larger than an amount of the conductive particles in the second gas diffusion layer.

13. The fuel battery of claim 1, wherein:
a width of a portion of the second rib that is in contact with the second gas diffusion layer is defined as Rw; and
the rib width Rw of the second separator and a groove width Gw of the second separator satisfy $0.7\ Gw \leq Rw \leq 1.3\ Gw$.

14. The fuel battery of claim 2,
wherein a thickness of the second gas diffusion layer is defined as h, and a width of a portion of the second rib that is in contact with the second gas diffusion layer is defined as Rw such that $0.29\ Rw \leq h \leq 0.48\ Rw$ is satisfied.

15. The fuel battery of claim 2, wherein:
the second gas diffusion layer includes conductive particles, conductive fibers, and a polymer resin; and
an average fiber length Fl of the conductive fibers in the second gas diffusion layer and an average fiber diameter Fd of the conductive fibers in the second gas diffusion layer satisfy $Fl < Rw/2$ and $Fd < h/100$.

16. The fuel battery of claim 2, wherein:
a width of a portion of the second rib that is in contact with the second gas diffusion layer is defined as Rw; and
the rib width Rw of the second separator and a groove width Gw of the second separator satisfy $0.7\ Gw \leq Rw \leq 1.3\ Gw$.

* * * * *